United States Patent
Papajewski et al.

(10) Patent No.: US 8,615,361 B2
(45) Date of Patent: Dec. 24, 2013

(54) METHOD FOR OBTAINING A SPEED PROFILE

(75) Inventors: Jens Papajewski, Unterhausen (DE); Christian Wilhelm, Koesching (DE); Felix Toepler, Aachen (DE); Qi Hui Huang, Aachen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/877,191

(22) PCT Filed: Sep. 28, 2011

(86) PCT No.: PCT/EP2011/004843
§ 371 (c)(1),
(2), (4) Date: May 28, 2013

(87) PCT Pub. No.: WO2012/041490
PCT Pub. Date: Apr. 5, 2012

(65) Prior Publication Data
US 2013/0261970 A1    Oct. 3, 2013

(30) Foreign Application Priority Data
Oct. 1, 2010    (DE) .......................... 10 2010 047 080

(51) Int. Cl.
*G01C 21/34*    (2006.01)
(52) U.S. Cl.
USPC ........... 701/533; 701/32.1; 701/119; 701/540
(58) Field of Classification Search
USPC .................. 701/32.1, 119, 533, 540
See application file for complete search history.

(56) References Cited

U.S. PATENT DOCUMENTS

| | | | | |
|---|---|---|---|---|
| 5,181,250 A | * | 1/1993 | Morgan et al. | 704/270 |
| 5,515,283 A | * | 5/1996 | Desai et al. | 701/461 |
| 7,561,068 B1 | * | 7/2009 | Denker et al. | 340/988 |
| 2004/0030670 A1 | * | 2/2004 | Barton | 707/1 |
| 2010/0082226 A1 | * | 4/2010 | Mukherjee | 701/118 |
| 2010/0114473 A1 | | 5/2010 | Kono et al. | |
| 2010/0250127 A1 | | 9/2010 | Hilbrandie et al. | |
| 2011/0224892 A1 | * | 9/2011 | Speiser | 701/118 |
| 2011/0257881 A1 | * | 10/2011 | Chen et al. | 701/204 |
| 2012/0016576 A1 | * | 1/2012 | Huang et al. | 701/200 |

FOREIGN PATENT DOCUMENTS

| | | |
|---|---|---|
| DE | 60033160 | 12/2007 |
| DE | 102007036794 | 2/2009 |

(Continued)

OTHER PUBLICATIONS

International Search Report for PCT/EP2011/004843, mailed on Dec. 22, 2011.

*Primary Examiner* — Calvin Cheung
(74) *Attorney, Agent, or Firm* — Staas & Halsey LLP (57) ABSTRACT

Certain processes are defined in a data record and in each case a multiplicity of such processes are preferably defined for different driver types. Each process is distinguished by an entry speed and an exit speed. A preliminary speed profile can be divided into route sections, to each of which a process from the defined processes corresponds. The assigned speed profiles can be completely complex, in particular also comprise nonlinear sections between the entry speed and the exit speed, and in this way constant travel can be simulated, for example through an oscillatory change in the speed. It is also equally possible for stationary phases with a specific frequency and duration to be included in a process. The situational context which is formed by other processes is taken into account in the definition of the speed profile.

16 Claims, 4 Drawing Sheets

(56) References Cited

FOREIGN PATENT DOCUMENTS

| DE | 102007059120 | 6/2009 |
| DE | 102008035944 | 4/2010 |
| DE | 102010047080.5 | 10/2010 |
| EP | 2221581 | 8/2010 |
| WO | 2010/081836 | 7/2010 |
| WO | PCT/EP2011/004843 | 9/2011 |

* cited by examiner

METHOD FOR OBTAINING A SPEED PROFILE

CROSS REFERENCE TO RELATED APPLICATIONS

This application is based on and hereby claims priority to International Application No. PCT/EP2011/004843 filed on Sep. 28, 2011 and German Application No. 10 2010 047 080.5 filed on Oct. 1, 2010, the contents of which are hereby incorporated by reference.

BACKGROUND

The invention relates to a method for acquiring a data record which represents the predicted speed of a vehicle over a multiplicity of route points of a route or alternatively assigns the speed to times which are defined with respect to travel on the route. In both alternatives, a speed profile is produced.

A method of this type is known as such, cf. in particular also DE 2007 059 120 A1, in which a refined form of the method is already described.

Conventionally, it is the function of a navigation system to search for a route which is an optimum route according to a specific criterion. One of the criteria includes that the route is traveled along as quickly as possible. It is then also necessary to determine with respect to the route how quickly said route can be traveled along overall. However, this is in turn possible only if a speed profile is known and in the past information about the properties of the road has been used to acquire such a speed profile. For example, a speed of 50 km/h, that is to say the maximum permitted speed, is assigned to a road in a built up area, a speed of 100 km/h, that is to say again the maximum permitted speed, is assigned to a country road, and an average speed of 110 km/h is assigned to the freeway. It is usually assumed, in an idolizing fashion, that the change between the speeds takes place quasi abruptly. In this context, in a graphic representation of the route specific speeds are assigned to individual nodes and branches in the manner of a tree representation.

DE 10 2007 059 120 A1 goes beyond this for the purpose of calculating the energy consumption as accurately as possible, and additionally takes into account the fact that an acceleration phase, or conversely a deceleration, must occur between individual phases in which the vehicle travels at a constant speed. In this context, a specific numerical value for the acceleration is assumed. However, when determining this value it is possible to take into account what driving style the vehicle driver has ("sporty" or "conservative"), and also a gradient of the road is taken into account.

DE 10 2007 059 120 A1 also involves certain assumptions being made, specifically in particular of an idealized traffic scene. In the event of traffic disruption, a disruption term is used, but the reality is mapped only to a limited extent using this disruption term.

DE 10 2008 035 944 A1 discloses a method for optimizing the driving mode of a motor vehicle according to ecological and economic criteria. A maximum possible speed profile is calculated on the basis of information about the motor vehicle and properties of the route to be traveled along as well as legally prescribed speed limits. Furthermore, a lower acceptable speed profile is calculated for the route. The actual speed profile which has values between the previously specified speeds is calculated as a function of a target arrival time predefined by a driver and the energy saving potential along individual route sections of the route.

WO 2010/081836 A1 discloses a method for determining an optimum speed profile along a route with the result that a motor vehicle can be operated in a particularly energy-efficient fashion. A first speed profile is determined which represents a mean value of a multiplicity of measured speed profiles along the route when there is a free flow of traffic. Taking into account speed limits along the route and energy consumption criteria, an optimum speed profile is determined at which the number of acceleration actions and braking actions along the route is minimized.

EP 2 221 581 A1 also presents a method for determining a speed profile along a route such that a motor vehicle can be operated in a particularly energy-efficient way. Taking into account data relating to the course of the route, the type of road being travelled on, speed limits, the traffic situation and a driving style of a driver, speed profiles are produced for individual route segments of the entire route. The speed profiles are in turn divided into individual driving maneuvers such as, for example, travel at a constant speed, braking maneuver and the like.

SUMMARY

One potential object is to make available a method of the generic type described at the beginning which ensures a speed profile which is as close to reality as possible, and which can therefore make the most precise prediction possible with respect to an arrival time for a predetermined route.

The inventors propose a method for acquiring a data record which represents the predicted speed of a vehicle as a speed profile over a multiplicity of route points of a route or times when the route is being traveled along. The method involves a) making available a first data record by means of which route points are assigned to a multiplicity of routes, b) making available a second data record by means of which a multiplicity of processes, to which at least one entry speed and one exit speed are assigned as defining variables are defined, wherein, in order to acquire the second data record, a multiplicity of routes are traveled along and in the process measured values for the speed are acquired at route points, and a multiplicity of driving styles are defined, and in the second data record a multiplicity of processes are assigned to each driving style, c) selecting a predetermined route on the basis of the first data record, d) determining a preliminary speed profile for the travel of a vehicle over the predetermined route, e) dividing up the route into route sections which are each assigned a process from the processes defined in the second data record, on the basis of the preliminary speed profile, and f) defining a speed profile for each process assigned in step e), wherein the definition is made for individual processes or for process groups composed of successive processes, and in at least one process or one of the individual processes or process groups it is taken into account here which process or which process group occurs in advance or afterwards.

According to the proposals, a first data record which assigns route points to a multiplicity of routes or (sub)routes (as far as possible on a complete road network) is therefore firstly made available. In addition, a second data record is made available by which a multiplicity of processes are defined, wherein at least one entry speed and one exit speed are provided as defining variables. The method comprises the fact that a multiplicity of routes are traveled along and in the process measured values for the vehicle speed are acquired at specific route points. The experience reflected indirectly in the measured values is then made visible in a direct way by virtue of the fact that a multiplicity (but preferably a finite number) of processes are defined, said processes are assigned an entry speed and an exit speed, and specifically the definition is carried out on the basis of the acquired measured values. By the inventors' proposals it is also possible firstly to use in a particularly effective way the measure known per se from DE 2007 059 120 A1 for distinguishing a multiplicity of driving styles. In the second data record it is possible to assign a multiplicity of driving styles (if sufficient data material is available). Certain processes can then be defined matching a specific driving style, for example in the manner of the "racing style" or the like up to a sporty driving style etc. Within the scope of making available the second data record, it is possible to define such processes which respectively actually occur according to their definition or at least in a similar form. For example, a process of acceleration from the speed 0 to the speed 180 does not have to be defined because this process is rare. Instead a process can be defined which is accelerated from a vehicle speed of 0 km/h to 53 km/h, and for acceleration at a set of traffic lights within a built up area after they switch to "green". A process of acceleration from 53 km/h to 85 km/h can then follow if the vehicle driver leaves the built up area and a speed limit of 80 km/h applies. In the event of the vehicle driver driving on a freeway, it is then possible to define an acceleration from 85 km/h to 130 km/h, an average speed, and finally increments of at least 10 km/h can be defined starting from 130 km/h. The actual process of acceleration from 0 km/h to 180 km/h can then be composed of a multiplicity of subprocesses.

This is also done below within the scope of the proposed method: a predetermined route is selected and a preliminary speed profile of the travel of a specific vehicle over the predetermined route is determined for the route, possibly with the previously known method. The dividing up of the route, in particular the complete dividing up of the route, into route sections then takes place, specifically in such a way that each route section is assigned a process from the processes defined in the second data record. The dividing up of the route takes place on the basis of the preliminary speed profile. In this way, a definitive speed profile can then be acquired. In the method, a speed profile is defined for each process for this purpose. In particular what happens outside the one process is at least partially taken into account here. Thus, on the one hand, a plurality of processes can be combined to form one process group, as it were a new process, and a speed profile can be assigned to the entire process group. However, it is important, in particular, that in at least one case the defined speed profile has an appearance which depends decisively on the adjacent process (or the adjacent process group). For example, different things can be assigned to the same constant speed from the preliminary speed profile depending on how the travel continues. Given travel at 40 km/h within a built-up area, a vehicle is stopped, that is to say braked completely to 0 km/h, at traffic lights on a regular basis. When travelling at 40 km/h out of a built-up area, subsequent acceleration can occur, with the result that the driver already accelerates a little in advance and gently brakes again.

The present proposals make use of the concept of a "process" to which an entry speed and an exit speed are assigned. The proposals introduce the concept of defining situational contexts. The use of the concept of a "process" also goes beyond simply assigning an average time to specific routes and assigning said average time to a specific branch in a graphic tree which symbolically represents the road traffic network. The totality of the processes can and should have, in particular, the property that the travel along a route can actually be divided into a multiplicity of processes without undefined situations remaining.

The concept of the process can also reflect relatively complex contexts above and beyond the concept of simple acceleration over a specific route, if appropriate, with a specific gradient (or simple constant travel or simple deceleration). The definition of the processes is therefore preferably configured in such a way that a profile of the speed between the entry speed and the exit speed, which profile comprises a nonlinear section, is defined for at least some of the processes. As it were, intermediate values for the speed are specified and these values do not simply emerge from a linear context. For example, a process can be assigned to a driving maneuver in which the vehicle driver travels through a bend: he firstly brakes the vehicle a little, but then accelerates out of the bend again up to the next straight-ahead travel. The measure of providing intermediate values for the speed also makes it possible, in particular, to allow for conditions outside the roadway. It is therefore even possible, to a certain extent, for a process of a statistically fluctuating variable to be allowed for: it may be the case that the vehicle has to come completely to a standstill before a set of traffic lights, but it may also be the case that the vehicle even slightly accelerates in order to be able to travel through the traffic lights. What happens on average can be represented by a specific process during which, for example, the vehicle is braked to a speed of >0 km/h, with the vehicle being subsequently accelerated again. A novel idea is also based on modeling a typical journey in which a constant speed is desired: in reality, the actual speed fluctuates somewhat about the desired speed, and this can be represented in a model by an oscillatory change in the speed. As a result, in the nonlinear section an oscillatory profile of the speed is preferably superimposed on a linear profile of the speed. It is also likewise possible to define a speed profile in which a section with a speed with a linear profile is interrupted by a section in which the speed is spontaneously increased or decreased, in particular instantaneously insofar as it is possible within the scope of the control of the vehicle. After the interruption, there is preferably a return to the interrupted linear profile, either in the case of a speed value at which the interruption took place or at a speed which has resulted per se during the progression of the linear profile over time, without the interruption.

The method preferably comprises the fact that a multiplicity of routes is travelled along and in the process measured values for the vehicle speed are acquired at specific route points. The experience reflected indirectly in the measured values is then made visible in a direct way by virtue of the fact that a multiplicity (but preferably a finite number) of processes is defined, said processes are assigned an entry speed and an exit speed, and specifically the definition is carried out on the basis of the acquired measured values.

In particular before step e) of the method a driving style is then selected (together with the selection of the predetermined route) either by an operator control input or a driving style is assigned on the basis of a trial run. By defining the driving style (selecting and/or assigning) it then becomes clear what multiplicity of processes is relevant. In step e) the selected or assigned driving style is therefore taken into account, specifically, for each route section, just one process from the processes defined for precisely this driving style in the second data record is assigned to each route section.

In addition, the selected or assigned driving style is also already preferably taken into account when the preliminary speed profile is determined. (For example, in the case of a specific driving style it can be assumed that the maximum permissible speed is exceeded by a certain absolute value etc., while in the case of another driving style it can be assumed that an attempt is made to comply exactly with the maximum permissible speed.)

In one preferred aspect, in the case of the data record made available in step a) information about the type of roads is also included in a manner known per se and this information is preferably also taken into account is step f). Connections are made only with what is known here. The same applies to taking into account an entry altitude and an exit altitude, possibly also a gradient.

In order to determine the energy consumption later when traveling along the predetermined route it may be helpful to determine, on the basis of the definitive speed profile, the power to be applied at the wheels of a motor vehicle traveling along the route, specifically assigned to the route points or times at which the data of the data record relating to the speed profile is also provided.

In addition, a number for indicating the quality of the prediction can be determined on the basis of the definitive speed profile.

The method is preferably carried out in a motor vehicle within the scope of the operator control of a navigation device. The use of alternative data processing devices is conceivable. It is basically the case that the first and second data records are stored in a memory of a motor vehicle, that step c) takes place on the basis of an operator control device in the motor vehicle, and steps d) to f) are carried out by a data processing device of the motor vehicle.

The inventors also propose a motor vehicle having a memory, an operator control device and a data processing device in which steps c) to f) can be carried out, wherein, in particular, in the motor vehicle a route can therefore be selected on the basis of which a speed profile is defined which is divided into route sections which are each assigned processes, wherein in at least some of the processes, a profile of the speed, which has a nonlinear section, is provided between the entry speed and the exit speed.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 6 shows two curves which relate, on the one hand, to a preliminary speed profile such as is used by conventional navigation systems and, on the other hand, shows a speed profile such as is predicted by the method, FIG. 7 and FIG. 8 each show an altitude profile, a speed profile which is assigned thereto and the power which is to be applied at the wheels here, wherein FIG. 7 shows these variables as a function of the route traveled, and FIG. 8 shows them as a function of the passing time.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
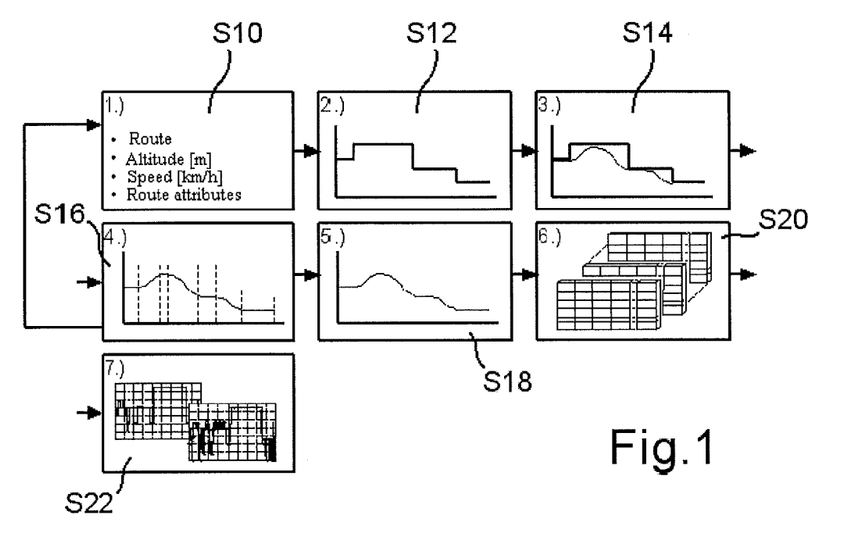
FIG. 1 is a flowchart explaining an aspect of the proposed method which is considered to provide the bases, FIG. 2 serves to explain a portion of the method from the flowchart according to FIG. 1.

In a preliminary method, it is assumed in step S10 that a data record is available in which a multiplicity of routes are stored which are each provided with information about the altitude (above sea level) at least at certain route points, wherein in addition information is available about the speed at which the vehicle can typically travel, for example the maximum permitted speed, and wherein in addition route attributes are stored, for example whether the route is a country road or a freeway.

A specific route is then selected. In step S12, a preliminary speed profile is specified for this route. In a manner known per se, a specific velocity is assigned to specific route sections, wherein there is an abrupt jump between the speeds. In step S14, this speed profile is refined, and in the same way acceleration to the speeds is taken into account, and likewise the deceleration to lower speeds. The route is then actually traveled along by a driver with a specific driving style and with a specific vehicle. In this context, the actual speed profile, which takes the place of what was predicted, is measured.

Figure 2:
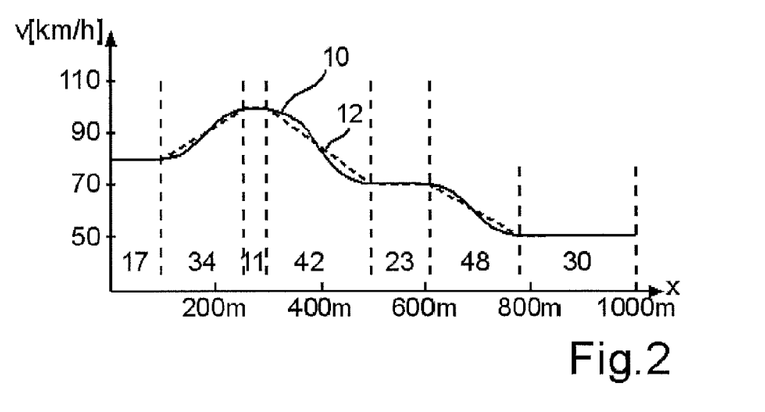

In step S16, the modeled speed profile which is shown with the dashed line 12 can then be derived from the measured preliminary profile 10 (FIG. 2) obtained in this way. In this context it is assumed that a specific route section (route FIG. 2 passes along the x axis) can be divided into specific subunits. Specific processes (which can also be referred to as "maneuvers") and which are recurrent are defined. For example, according to FIG. 2 the first subroute is assigned the maneuver "17" at which the vehicle is driven constantly at 80 km/h. The maneuver "34" according to which the vehicle is accelerated from 80 km/h to 100 km/h, is then assigned. In the case of the maneuver "11", the vehicle is then driven constantly at 100 km/h, and in the case of maneuver "42" the vehicle is then decelerated from 100 km/h to 70 km/h.

In the case of a first run through the step S16 and the assignment of processes and/or maneuvers, such processes are firstly defined coarsely. However, it is assumed that a multiplicity of routes are actually traveled along and in the process measured values are recorded which represent an actual speed profile, and therefore as explained in FIG. 2 the speed profiles can always be better divided into processes. It gradually becomes apparent which processes repeat frequently and which are rather rare. Typical processes are then defined with mean values.

Figure 3:
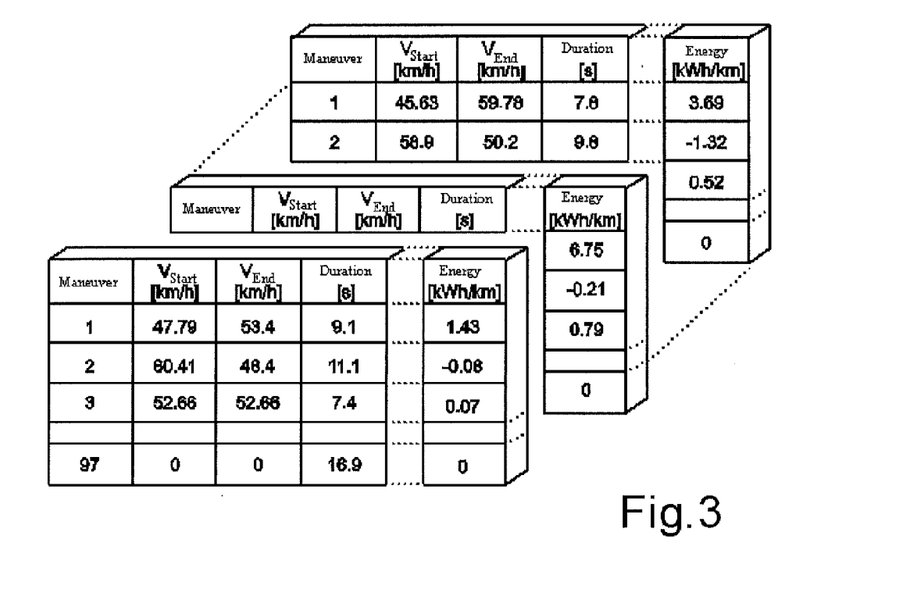
FIG. 3 is a schematic view of a matrix such as is the result of the method explained by FIG. 1.

After running through the step S16, in the step S18 the speed profile is considered energetic, that is to say it is calculated how much energy a specific vehicle requires when running through the speed profile as a result of step S16. The steps S10 to S18 are run through iteratively so that a multiplicity of measured values of actual speed profiles is made available in the manner of the initially assumed preliminary speed profile 10. Ultimately in step S20 a matrix is obtained in which, as can be seen in FIG. 3, a plurality of processes ("maneuvers") is defined. In this context, a differentiation according to the type of driver is firstly made. The processes can in fact be divided on the basis of specific properties as to whether the driver drives particularly aggressively or defensively or has a moderate style. In the example in FIG. 3, a distinction is made between 8 types of driver.

In the case of a driver "1" it is, for example, assumed that a first maneuver starts with a speed of 47.79 km/h and ends with a speed of 53.4 km/h; the duration is 9.1 seconds. In this context, a specific gradient over which the acceleration to took place is assumed. The energy input is then 1.43 kWh/km.

In the case of a maneuver "2", the vehicle is decelerated from 60.41 km/h to 48.4 km/h. The duration is 11.1 seconds, and energy is even recovered (for example through recuperation). A specific gradient is also assumed here.

In the case of maneuver "2" it is assumed that from a speed limit of 60 km/h the vehicle is driven into a built up area in which the vehicle driver, who may be defensive here, drives just under 50 km/h.

In the case of maneuver "3", the vehicle is driven at a constant speed of 52.66 km/h, which corresponds to a typical speed within a built up area when the driver wishes to keep to the speed limit.

In the case of driver 8, it is apparent, for example from maneuver "1", which does not necessarily correspond to maneuver "1" by front seat passenger 1, that the latter accelerates relatively quickly and in the process consumes a relatively large amount of energy.

The maneuvers each correspond to typical events for specific types of driver. The number of maneuvers is such that all the possible driving situations can be mapped by combination of the individual maneuvers.

Figure 5:
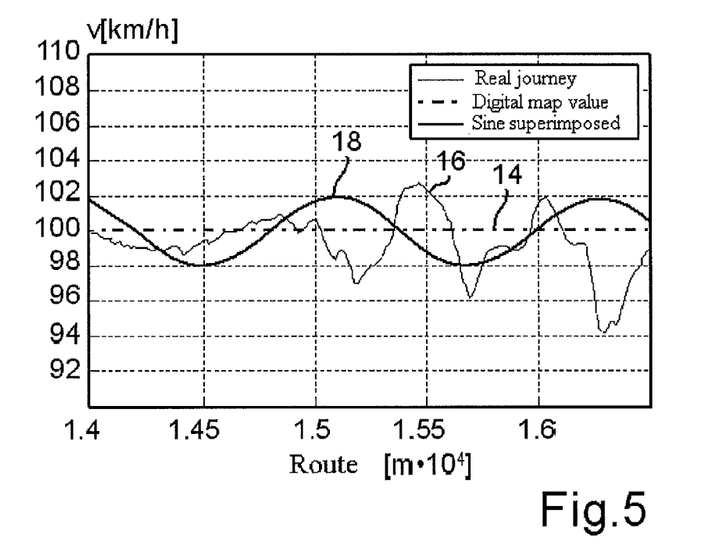
FIG. 5 shows three graphs on the basis of which the modeling of travel at a constant speed is illustrated.

How this occurs in the case of constant travel is explained below with reference to FIG. 5: a vehicle driver would like to drive according to the graph 14, that is to say stays at a constant speed of, for example, 100 km/h. In fact, he travels according to the curve 16, that is to say stays initially somewhat below the speed, then drives somewhat too quickly, then drives again somewhat more slowly (for example in the case of cornering) and then accelerates after he has noticed that he can drive more quickly etc. This fluctuation in speed can be simulated by superimposing an oscillatory change in speed on the constant travel according to the curve 18.

In order to map a stationary state in town traffic, this can even go to the extent that the amplitude of the oscillatory change extends down to the value of 0 km/h. Likewise, a spontaneous change in speed can also be modeled on the value of 0 km/h, which is then followed again by travel at a finite speed.

The method is initially carried out iteratively according to the steps S10 to S18 until the matrix S20 is available with a sufficient quality. In FIG. 1 it is shown here that the iteration leads back from step S18 to S10 again. This does not have to be implemented so precisely, for example the step S20 can already be run through with a preliminary matrix, and it is possible to return to the step S12. What is explained with respect to the steps S12 to S18 with respect to a modeled curve is implemented here for actual speed profiles.

After the step S20 has been run through, and the matrix is therefore available in its definitive form, the totality of data values acquired up to then can be evaluated statistically, see step S22, in order to be able to make a statistical statement about the frequency of the individual maneuvers. This statement can also be used later to make a selection regarding the maneuvers if these are to be used or in order to specify the quality of the prediction.

Figure 4:
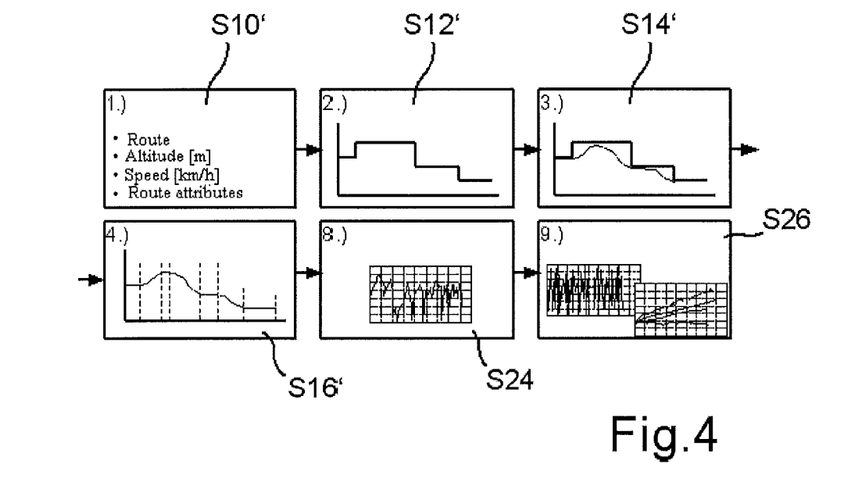
FIG. 4 shows a flowchart corresponding to FIG. 1 for the method such as is carried out in a specific vehicle using the matrix from FIG. 3.

FIG. 4 then explains what takes place in an individual vehicle within the scope of the method, as can be carried out given the presence of the matrix as a data record: step S10' is also carried out again here, and therefore corresponding data are available to the navigation system. It is then assumed here that the driver actually selects a specific route which he would like to drive along. (This selection of the route can also be predefined by the navigation system if the vehicle driver specifies a specific objective.) In step S12' the preliminary speed distribution is then assumed again, and then in step S14' a model is made with an acceleration. In step S16', the smoothing of the speed profile then takes place. In this context, an actual measured speed profile is not used this time since, of course, a speed profile is to be predicted. Finally, the smoothed speed profile is divided into a multiplicity of subsections which are each allocated a maneuver. In this context, a maneuver is assigned to that type of driver who is presently intending to drive along the route. The driver can select himself, for example by pressing a button, what driving style he intends to adopt, or the driving style of the driver can be inferred in the vehicle on the basis of previous experiences.

In step S24 the actual speed profile including a modulation is then determined.

Figure 6:
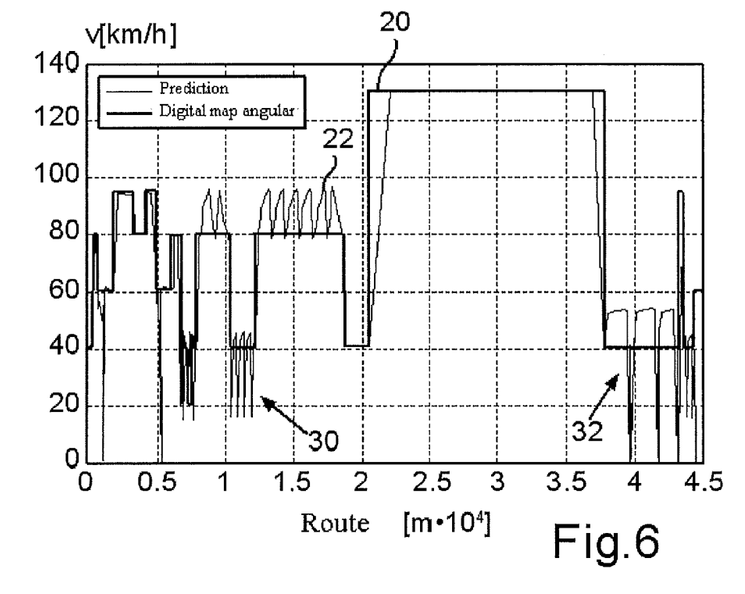

For example, FIG. 6 shows the speed profile determined in step S12' as a graph 20, and in the form of graph 22 it is then shown what speed profile arises from the step S24. Here, in particular the modulation explained above with respect to FIG. 5 in the range between 12,500 m and 17,500 m is taken into account. Further types of modulations are apparent from the figure, for example nonoscillatory modulation is assumed for assumed constant travel at 40 km/h between 11,000 m and 12,000 m (reference number 30). A specific maneuver is defined here. In the range between 37,500 m and 43,000 m (reference number 32) there are alternately modulations of 40 km/h in the upward direction and the downward direction (stationary phases). A specific maneuver is also defined here. It is to be noted that the two maneuvers between 11,000 m and 12,000 m, on the one hand, and between 37,500 m and 43,000 m, on the other, are both originally based on travel at a constant 40 km/h and that in each case other types of maneuvers and speed profiles have been selected. The modulation of stationary phases in frequency and duration is, in particular, different. The reason for this is that at least the directly following maneuver or the directly preceding maneuver is taken into account in the definition of the speed profile assigned to the respective maneuver. Therefore, given a reference number 30, travel at an average of 40 km/h occurs between two sections at an average of 80 km/h. This maybe travel on the country road, wherein in the case of a constriction or set of roadworks the speed is to be reduced to 40 km/h. The defined speed profile is one such as then usually occurs at such constrictions. In contrast, the situation according to the reference number 32 follows travel on the freeway, for example comprise driving on the freeway exit at an average of 40 km/h. The defined speed profile is then naturally different from that which is shown in the case of reference number 30. By complying with the situational context, that is to say the maneuver adjacent in the time line, it is therefore possible to operate in a differentiated fashion during the modulation with the result that modeling which is closer to reality is made possible.

Figure 7:
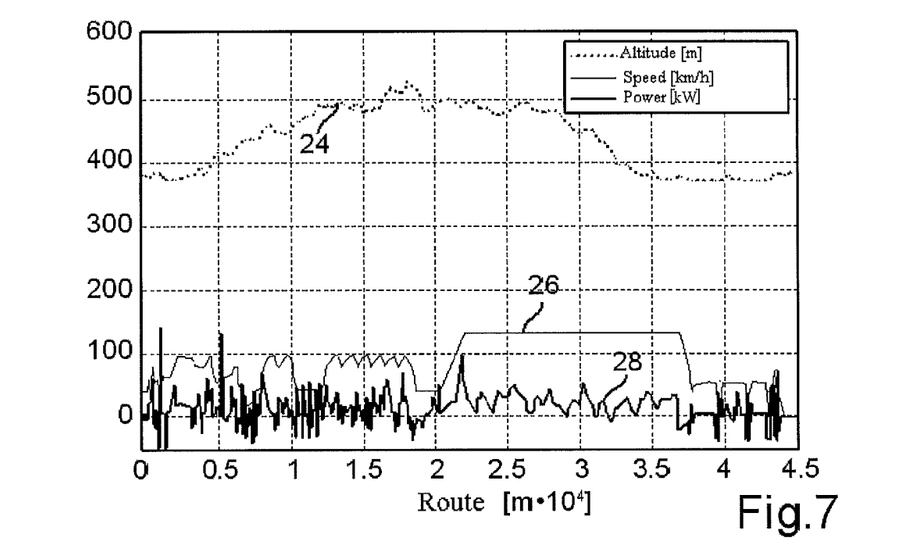

Finally, in step S26 it is also possible to derive how the power which is to be applied by the individual wheels of the motor vehicle looks and at the same time it is possible to make a statement about the quality of the speed prediction. FIG. 7 shows, as a graph 24, the altitude profile such as occurs when traveling along a specific route. FIG. 7 shows, as graph 26, the speed profile which corresponds there to that from FIG. 6. The power which is to be applied is then also displayed as a graph 28 for this speed profile.

Figure 8:
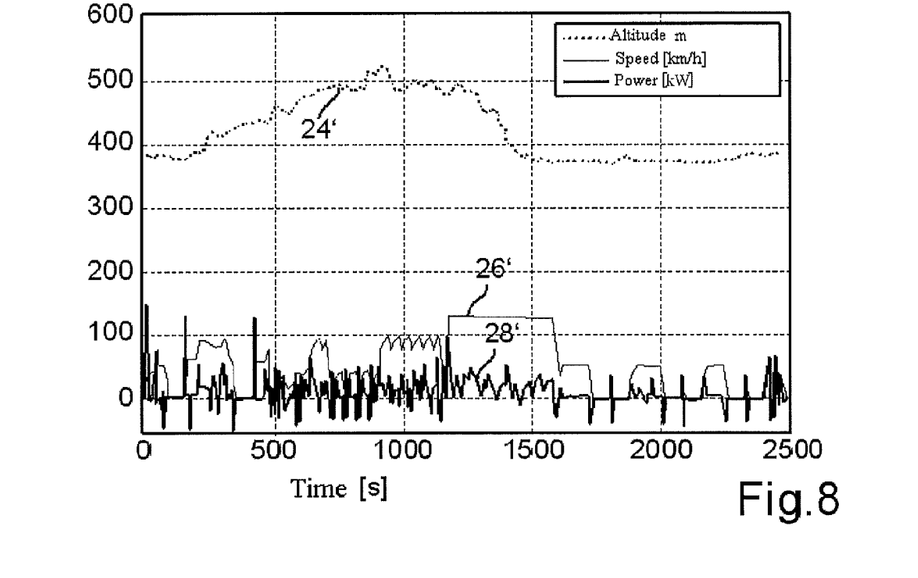

FIG. 8 shows the same only as a function of the time, with the graphs 24', 26' and 28'.

As a result, in particular as a result of the concept of the "processes" or maneuvers from a corresponding matrix (FIG. 3), which are derived on the basis of actual measurements, the speed profiles 26, 26' which are ultimately determined reflect best the reality, in particular the reality which applies to a specific driver. As a result, in particular the arrival time and the energy consumption can also be determined particularly precisely (or precisely with a statistically high probability): this therefore provides progress in the calculation of the travel time and of the energy consumption for a specific route.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for acquiring a data record which represents a predicted speed of a vehicle, so as to produce a corrected speed profile, the corrected speed profile including speed information over a multiplicity of route points or a multiplicity of elapsed route-driving times, comprising:
   making available a first data record by which route points are assigned to each of a multiplicity of routes;
   making available a second data record by:
      identifying a multiplicity of driving processes, each driving process having an entry speed and an exit speed;
      acquiring measured values for speed during data acquisition trips, the measured values for speed being acquired at respective route points; and
      using the measured values to assign driving behavior information to each driving process such that the second data record defines the multiplicity of driving processes for a driving style;
   selecting a selected route on the basis of the first data record;
   determining a preliminary speed profile for travel of the vehicle over the selected route;
   using the preliminary speed profile to divide up the selected route into route sections, each section being assigned one of the driving processes; and
   producing the corrected speed profile by assigning speed information to each driving process assigned to the selected route, the speed information being assigned using the second data record, wherein
   for at least one driving process assigned to the selected route or group of driving processes assigned to the selected route, speed information is assigned by taking into account a preceding or succeeding driving process or group of driving processes.

2. The method according to claim 1, wherein in at least one of the driving processes, a speed profile, which has a nonlinear section, is defined between the entry speed and the exit speed.

3. The method according to claim 2, wherein in the nonlinear section an oscillatory change in speed is superimposed on a linear profile of the speed.

4. The method according to claim 1, wherein
   for at least one of the driving processes, a speed profile is defined to have first and second sections, and
   the first section has an interrupted linear profile
   the second section interrupts the first section,
   speed is spontaneously increased or decreased to a different speed during the second section, and
   after the second section, the speed profile returns to the interrupted linear profile.

5. The method according to claim 1, wherein
   there at least first and second data records defining driving processes respectively for first and second driving styles,
   the first data record defines the driving style of a first driver using measured values acquired while the first driver travels along data acquisition trips,
   the second data record defines a sporty, conservative or racing driver style,
   the driving style is selected by an operator control input, and
   the second date record for the driving style selected is taken into account when speed information is defined for each driving process assigned to the selected route.

6. The method according to claim 1, wherein
   either
      the driving style is selected by an operator control input, or
      the driving style is assigned based a test run, and
   the driving style selected or assigned is taken into account when speed information is defined for each driving process assigned to the selected route.

7. The method according to claim 6, wherein the driving style selected or assigned is also taken into account in determining the preliminary speed profile.

8. The method according to claim 1, wherein
   the first data record also includes information about type of roads, and
   the type of roads is taken into account when speed information is defined for each driving process assigned to the selected route.

9. The method according to claim 8, wherein taking into account the preceding or succeeding driving process or group of driving processes comprises taking into account a type of road travelled along during the preceding or succeeding driving process or group of driving processes.

10. The method according to claim 1, wherein
    the first data record also includes information about an altitude of route points, and
    the altitude of route points is taken into account when speed information is defined for each driving process assigned to the selected route.

11. The method according to claim 10, wherein taking into account the preceding or succeeding driving process or group of driving processes comprises taking into account an entry altitude or an exit altitude.

12. The method according to claim 1, wherein the speed profile is used to determine a power to be applied to wheels of the vehicle at times while travelling along the route or at the route points of the route.

13. The method according to claim 1, wherein
    the first and the second data records are stored in a memory of the vehicle,
    the selected route is selected based on an operator control device in the vehicle, and
    a data processing device of the vehicle is used to determine the preliminary speed profile, to divide up the selected route into route sections and to assign speed information to each of the driving processes.

14. The method according to claim 1, wherein
    a second data record is made available for each of a plurality of drivers,
    each driver has an individual driving style, and
    data acquisition trips are used by each driver to assign driving behavior information to each driving process.

15. The method according to claim 1, further comprising using the corrected speed profile to predict arrival time.

16. The method according to claim 1, further comprising using the corrected speed profile to predict fuel consumption.

* * * * *